United States Patent
Kobayashi

(10) Patent No.: US 7,548,495 B2
(45) Date of Patent: Jun. 16, 2009

(54) OPTICAL STORAGE DEVICE, RECORDING METHOD OF OPTICAL STORAGE MEDIUM AND PROGRAM

(75) Inventor: Shinya Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 590 days.

(21) Appl. No.: 11/085,418

(22) Filed: Mar. 21, 2005

(65) Prior Publication Data

US 2006/0126460 A1    Jun. 15, 2006

(30) Foreign Application Priority Data

Dec. 10, 2004    (JP)    ............................. 2004-357779

(51) Int. Cl.
- G11B 5/09    (2006.01)
- G11B 7/00    (2006.01)
- G11B 7/24    (2006.01)
- G11B 19/00    (2006.01)
- G11B 20/10    (2006.01)
- G11B 27/22    (2006.01)

(52) U.S. Cl. .................. 369/47.44; 369/47.1; 369/116; 369/124.12; 369/275.2; 369/44.32

(58) Field of Classification Search .............. 369/44.32, 369/47.14, 13.14, 44.14, 44.11, 44.25, 47.36, 369/47.38, 47.5, 53.3, 47.53, 53.1, 53.12, 369/53.23, 53.28, 53.35, 53.42, 53.43, 59.11, 369/59.14, 47.1, 59.1, 116, 124, 126, 109, 369/106, 110, 47, 44.26, 275.1, 275.2, 275.3, 369/275.4, 58

See application file for complete search history.

(56) References Cited

U.S. PATENT DOCUMENTS

2004/0218480 A1 *    11/2004    Ichikawa et al. ......... 369/30.21

FOREIGN PATENT DOCUMENTS

JP    2001-222381    8/2001

* cited by examiner

Primary Examiner—Wayne Young
Assistant Examiner—Dionne H Pendleton
(74) Attorney, Agent, or Firm—Greer, Burns & Crain, Ltd

(57) ABSTRACT

A write retry processing unit repeats a write retry operation of a write and a verify, while performing a setting change of a focus offset for recording a data on an optical storage medium in case a verify error occurs in executing the write and a verify try fails. A learning processing unit retains a sum total of the number of adding times of the successful focus offset and the number of subtracting times of the successful retry offset as a learning result at the successful time of the write retry, and a write condition changing unit changes the focus offset setting value of the default so as to be drawn near to the latest focus offset which succeeds in the retry when the absolute value of the learning result retained in the learning processing unit is equal to or more than a threshold value.

9 Claims, 15 Drawing Sheets

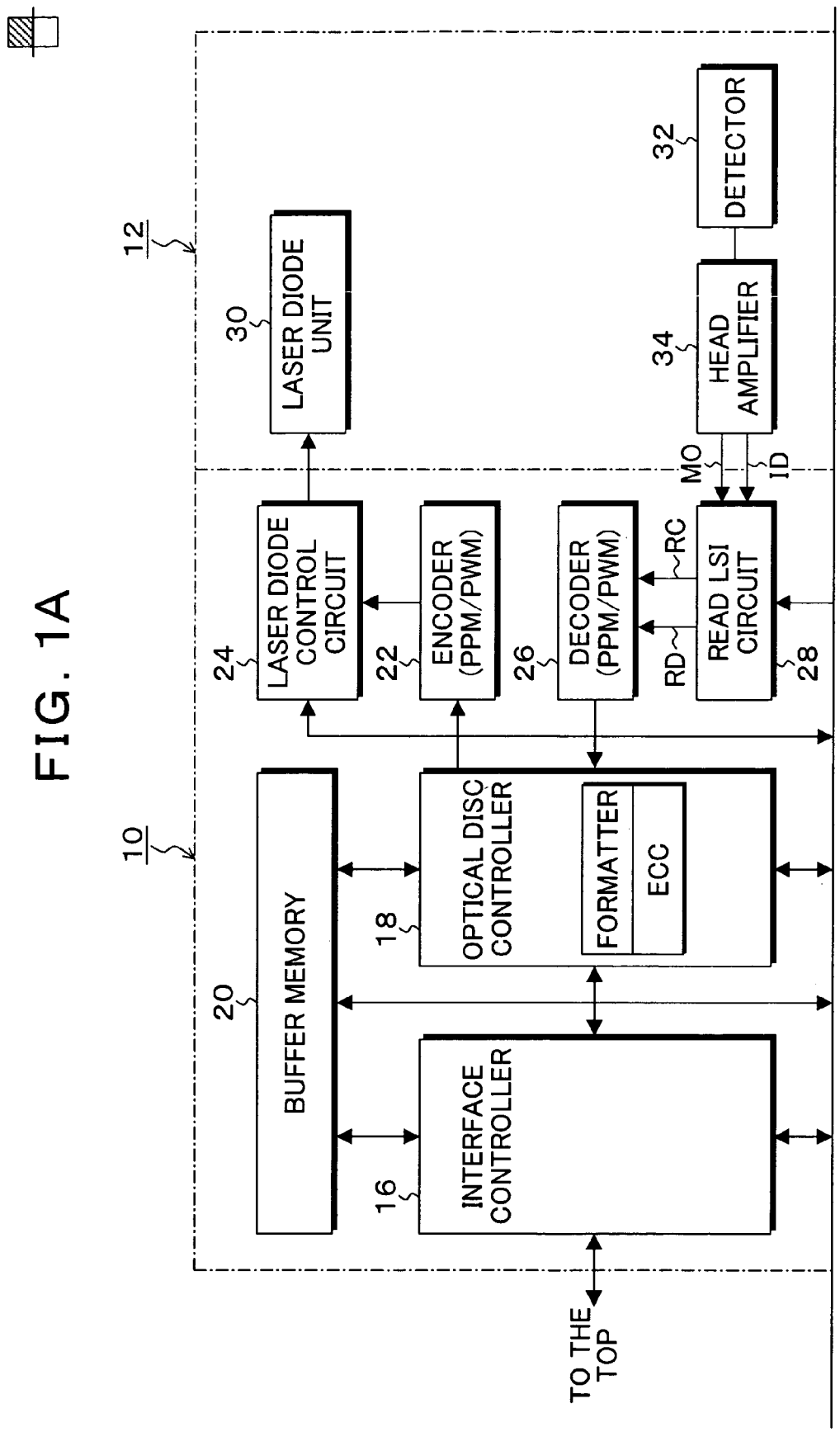

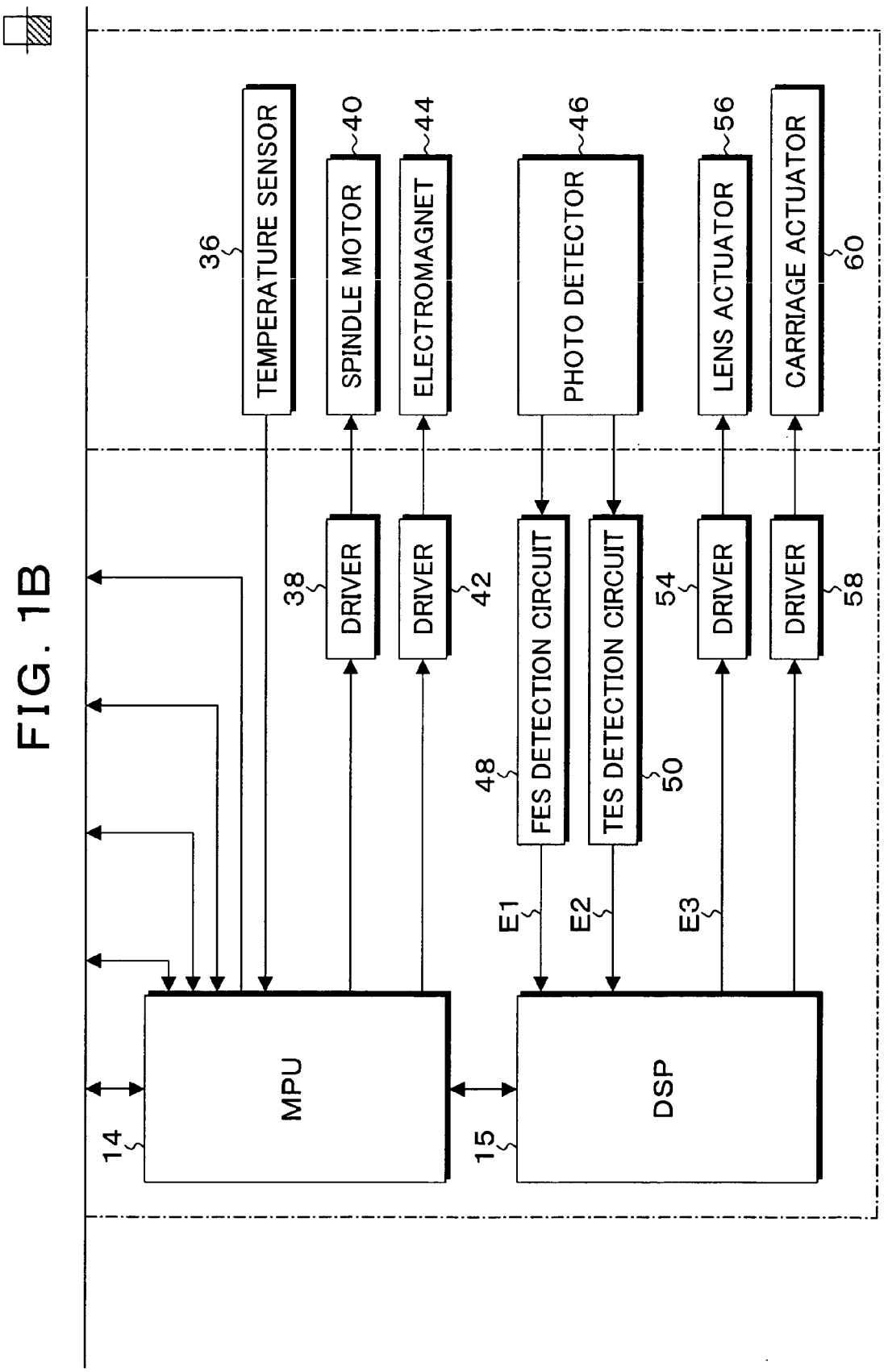

| NUMBER OF WRITE RETRIES | WRITE POWER | FOCUS OFFSET |
|---|---|---|
| 1 | DEFAULT | DEFAULT |
| 2 | ΔPw ADDITION | DEFAULT |
| 3 | ΔPw SUBTRACTION | DEFAULT |
| 4 | DEFAULT | ΔFOFST ADDITION |
| 5 | DEFAULT | ΔFOFST SUBTRACTION |
| 6 | DEFAULT | DEFAULT |

| NUMBER OF WRITE RETRIES | WRITE POWER | FOCUS OFFSET | COEFFICIENT |
|---|---|---|---|
| 1 | DEFAULT | DEFAULT | −1 |
| 2 | ΔPw ADDITION | DEFAULT | --- |
| 3 | ΔPw SUBTRACTION | DEFAULT | --- |
| 4 | DEFAULT | ΔFOFST ADDITION | +1000 |
| 5 | DEFAULT | ΔFOFST SUBTRACTION | −1000 |
| 6 | DEFAULT | DEFAULT | −1 |

FIG. 12

| NUMBER OF WRITE RETRIES | NUMBER OF PROCESSING SECTORS | NUMBER OF SUCCESSFUL SECTORS | COEFFICIENT |
|---|---|---|---|
| 1 | 10 | 0 | −1 |
| 2 | 10 | 0 | ---- |
| 3 | 10 | 0 | ---- |
| 4 | 10 | 3 | +1000 |
| 5 | 7 | 7 | −1000 |

OPTICAL STORAGE DEVICE, RECORDING METHOD OF OPTICAL STORAGE MEDIUM AND PROGRAM

This application is a priority based on prior application No. JP 2004-357779, filed Dec. 10, 2004, in Japan.

BACKGROUND OF THE INVENTION

1. Field of the Invention

The present invention relates to an optical storage device, a recording method of an optical storage medium, and a program for performing the recording and reproduction of information by using a laser beam, and in particular, it relates to an optical storage device, a recording method of an optical storage medium, and a program which optimizes a retry in case an error occurs in recording and reproduction operations of the optical storage medium including a MSR medium which records and reproduces a data in density smaller than a beam diameter.

2. Description of the Related Arts

Heretofore, in general, an optical storage reproduction device such as a MO drive and the like has been provided with a write retry function at the recording time to the medium, and a read retry and a verify retry function at the reproduction time from the medium. The recording to the medium has been made in order of an erase, a write, and a write verify. There exist a great many number of parameters for changing a setting value in such a retry. In the parameters of a read retry and a verify retry, there are a cut off frequency of a regenerative magnetic field, a read power, and a low pass filter, a slice level of a boost and a slice circuit, a window value (window delay time) of a data discriminator, and a focus offset. Further, in the parameter of the write retry, there are an erase power, a write power, an erase magnetic field, and a write magnetic field. By using such retry functions, a write error and a read error are prevented.

However, in such a conventional optical storage reproduction device, even when the retry function is used, the write error and the read error are not completely prevented. As a main cause thereof, a recording to the medium by a deviated write power is conceivable. Even when there does not occur the write error or the read error due to this deviation of the write power, there still occurs the read error. Hence, it is necessary to take measures for preventing the recording to the medium by the deviated write power. As a cause of the deviation of the write power, there are cited various factors such as a variation of device, a characteristic of medium, a deviation of the focal point, and the like. Particularly in recent years, a focal length of object lens has come to be short due to miniaturization of the optical system, and there is a possibility of occurrence of the write error due to a deviation of focal point.

According to the present invention, there are provide an optical storage device, a recording method of an optical storage medium and a program, which optimizes the retry in case an error occurs by the recording operation of an optical recording medium.

SUMMARY OF THE INVENTION

The present invention provides an optical recording and reproduction device. The optical recording and reproduction device of the present invention is characterized by comprising:

a recording unit for recording a data on an optical storage medium by a laser beam;

a reproduction unit for reproducing a data recorded in the optical storage medium by setting a parameter necessary for reproduction to an optimum value; and a write retry processing unit in which, while the setting change of a focus offset for recording a data on the optical storage medium is performed, a write retry operation for write and verify is repeated in case a verify error occurs in the recoding unit and a write verify fails.

Here, the write retry processing unit, at the write retry time, repeats a retry operation of plural stages including a setting change of parameter for adding a retry offset to the focus offset setting value of a default, and a setting change of parameter for subtracting the retry offset from the focus offset setting value. The optical storage device of the present invention further comprises: a learning processing unit for retaining a sum total of the number of addition times of the successful focus offset setting value and the retry offset and the number of subtraction times of the successful retry offset as a learning result at the successful time of the write retry; and a write condition changing unit changing the focus offset setting value of a default to be drawn near to the latest focus offset setting value which succeeds in the retry when the absolute value of the learning result retained in the learning processing unit is equal to or more than a threshold value.

The optical storage device of the present invention further retains the number of recording sectors of a write command from a high order device, and at the same time, comprises: a learning processing unit for retaining a sum total of the product of the number of recordable sectors and a coefficient provided in advance for each stage every time the retry operation of plural stages is repeated by the write retry processing unit as a learning result; and a write condition changing unit changing the focus offset setting value of a default to be drawn near to the latest focus offset which succeeds in the retry when the absolute value of the learning result retained in the learning processing unit is equal to or more than a threshold value.

In this case, the learning processing unit comprises the steps of:

calculating a first total value B adding the value multiplying the successful number of sectors by a predetermined coefficient for every write retry which changes a condition;

calculating a second total value C adding the value multiplying the successful number of sectors by a predetermined coefficient for every writeretry which does not change the condition; finding a learning count value A by adding a total value of the learning count value at the previous learning closing time and the first total value B to the second total value C in case a total value of the learning count value at the learning closing time and the first total value B is below 0, and in case the learning count value A is below 0, 0 is clipped, and when the learning count value A is below 0, it is retained as it is, and finding a learning count value A by subtracting the second total value C from the total value of the learning count value at the previous learning closing time and the first total value B in case a total value of the learning count value at the previous learning closing time and the first total value B is equal to or more than 0, and when the learning count value A is below 0, 0 is clipped, and when the learning count value A is equal to or more than 0, it is retained as it is.

The retry processing unit performs a setting change of the focus offset according to at least either of each zone formatted by the optical storage medium at the write retry time, each area diving a recording area of the optical storage medium into a plurality of areas, and a temperature in the device.

The present invention provides a recording method of the optical storage medium. The recording method of the present invention is characterized by comprising:

a recording step of recording a data on the optical storage medium by a laser beam; and a write retry processing step of repeating a write retry operation of an erase, a write, and a verify, while performing the setting change of the focus offset for recording a data on the optical storage medium in case a verify error occurs in the recording step and a verify retry fails.

The present invention provides a program to be executed by a computer of the optical storage device. The program of the present invention is characterized by allowing the computer to execute:

a recording step of recording a data on the optical storage medium by a laser beam;

and a write retry processing step of repeating the write retry operation of the write and the verify, while performing the setting change of the focus offset for recording a data on the optical storage medium in case a verify error occurs in the recording step and a verify retry fails.

The details of the recording method and the program of the optical storage medium in the present invention are basically the same as the optical recording and reproduction device of the present invention.

The present inventor has observed that a deviation of the write power is attributable to a variation of the device and a characteristic of the medium and it is attributable to a deviation of a focal point, and as a result, he has found that the former can be coped with by absorbing the deviation of the write power by allowing the write power to rise and fall in the process of the write retry. While, with respect to the deviation of the focal point, he has found that, by adding and subtracting the value of the focus offset by the present invention in the process of the write retry, the focal point is changed, so that the deviation of the write power owing to the deviation of the focal point can be absorbed. The change of the offset in this write retry is a processing executed strictly in the write retry, and unless the default value of the write power or the focus offset is changed, the similar write retry occurs. Hence, in the present invention, not only the write power and the focus offset are changed by the write retry, but also a state at the write retry time on the occasion of the write successful time is stored, and the setting value at the successful time and a relation between the setting value and the number of successful sectors are learned, and a learning process is performed such that the default value of the focus offset is changed so as to make it a new default value. In this way, by independently or jointly using both of the function of changing the write power and the focus offset at the write retry time and the write learning function by the setting value and the like at the write successful time, the present invention can improve the write power deviation and the deviation of the focal point. As a result, the occurrence of the write retry and the read retry, and the occurrence of the write error and the read error can be reduced, so that a stable recording and reproduction can be performed and the performance of the device can be improved. Particularly, for the device which comprises a lens guiding a light to a miniaturized optical system and a photodetector as well as an optical system short in the focal length to the photodetector, a technique for changing the focus offset by the write retry of the present invention is effective. When the device which miniaturizes the optical system causes a problem in a performance test and the like conducted at a production stage, in case the technique of the present invention is not available, the situation has to be coped with by mechanical readjustment of a head and replacement of parts.

However, by virtue of the present invention, except for those exceptionally worse in performance, mechanical unevenness can be absorbed with the performance test and the like cleared, and an incidence rate of defective products is reduced, thereby improving the production efficiency. Such improvement of the commercialization rate of product is an effective technique for the manufacturer of the device, and the present invention can greatly contribute to this point.

The above and other objects, features, and advantages of the present invention will become more apparent from the following detailed description with reference to the drawings.

BRIEF DESCRIPTION OF THE DRAWINGS

FIGS. 1A and 1B are explanatory drawings of an optical storage device adapted to the present invention;

FIG. 7 is an explanatory drawing of a write retry control table used in a first embodiment of the write retry processing of the present invention;

FIG. 9 is an explanatory drawing of the write retry control table used in a second embodiment of the write retry of the present invention;

FIG. 12 is an explanatory drawing of a specific example of a learning count value generated by the learning processing of FIG. 11.

DETAILED DESCRIPTION OF THE PREFERRED EMBODIMENTS

Figure 2:
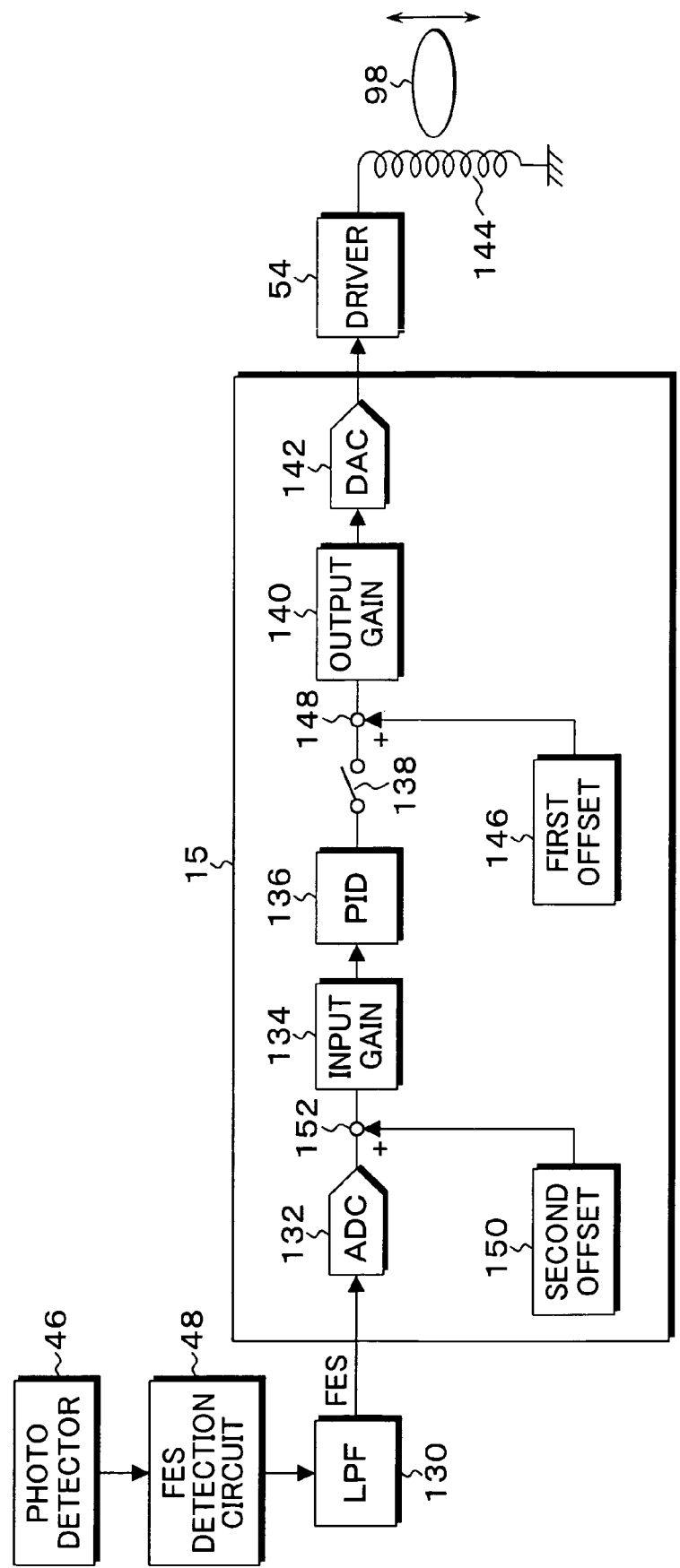
FIG. 2 is an explanatory drawing of focus servo loop configured by a DSP of FIGS. 1A and 1B.

FIGS. 1A and 1B are explanatory drawings of an optical disc drive as an optical storage device of the present invention, and takes an optical magnetic disc (MO) cartridge as an optical magnetic storage medium as an example. In FIGS. 1A and 1B, an optical disc drive is a drive, which can record and reproduce by using a land of medium, a land group or the group, and is constituted by a controller 10 and an enclosure 12. The controller 10 comprises a MPU 14 as a firmware which performs a total control, an interface controller 16 which performs an interchange with a host, a formatter necessary for read and write of the medium, an optical disc controller (ODC) 18 comprising an ECC function, and a buffer memory 20. For the optical disc controller 18, an encoder 22 as a write system is provided, and moreover, a detector 32, a head amplifier 34, a read LSI circuit 28, and a decoder 26 as a read system for the optical disc controller 18 are provided. Further, a laser diode control circuit 24, and the laser diode unit 30 are provided. The detector 32 receives a return light from an optical magnetic disc, and outputs a signal ID and a signal MO to the read LSI circuit 28 through the head amplifier 34. The read LSI circuit 28 prepares a read clock and a read data from the inputted signal ID and signal MO, and outputs them to the decoder 26. The MPU 14 is inputted with an environmental temperature of the interior of the device detected by a temperature sensor 36, and based on the environmental temperature, an emission power in the laser diode unit 30 is optimized. Further, the MPU 14 controls a spindle motor 40 through a driver 38, and moreover, controls an electromagnet 44 through a driver 42. The electromagnet 44 supplies an external magnetic field at the recording and erasing time of a MO cartridge usage, and moreover, supplies the external magnetic filed at the reproduction time also in the case of a super resolution optical magnetic medium (MSR medium) in the MO cartridge of 1.3 GB and 2.3 GB. A DSP 15 performs a servo-control, which positions an object lens mounted on a head actuator at a target position of an optical magnetic disc based on a servo error signal. This servo control has two functions of a track control to position the object lens at the target track position of the medium and a focus control to control the object lens for a focusing position of the medium. Corresponding to this servo control, a photodetector 46, a focus error signal detection circuit 48, and a track error signal detection circuit 50 are provided. The focus error signal detection circuit 48 prepares a focus error signal, for example, by a knife-edge method as a focus optical system. With respect to the focus control, the DSP 15 drives a lens actuator 56 by a driver 54, and turns ON the focus servo by a focus retract control and positions the object lens at a focused position in a direction of an optical axis. Further, with respect to the track control, the DSP 15 drives a carriage actuator 60 using a VCM by a driver 58, and positions the object lens at a target track center on the medium.

FIG. 2 is an explanatory view of a focus servo loop to be realized by the DSP 15 of FIGS. 1A and 1B. In FIG. 2, a reflected light from the optical disc is converted into an electrical signal by the photodetector 46, and after that, it is converted into a focus error detection signal by the FES detection circuit 48, and is inputted to a SDP 15 through a low pass filter 130. The SDP 15 is provided with an AD converter 132, an input gain adjustor 134, a PID control unit 136, a servo switch 138, an output gain adjustor 140, a DA converter 142. The output of the DSP 15 is amplified by the driver 54 using a power amplifier, and after that, it drives a focus coil 144, and drives an object lens 98 in a direction of the optical axis to perform a focus control. An adder 148 of the input side of the output gain adjustor 140 is provided with a first focus offset from a first offset adjustor, and this becomes a control target value of the focus servo. For the first focus offset, an optimum value decided by an initial adjustment when the MO cartridge is thrown in is used. An adder 152 of the input side of the input gain adjustor 134 is set with a second focus offset from a second offset adjustor 150. This second focus offset is used for correcting a defocusing owing to variation in temperature and the like during the usage of the device, and sets the optimum value obtained in the gain adjustment processing to be performed at the final stage of the device assembly as a default. In the present invention, since the deviation of the focus point is adjusted by the write retry processing, the write retry operation is performed, while changing the second focus offset of the default.

Figure 3A:
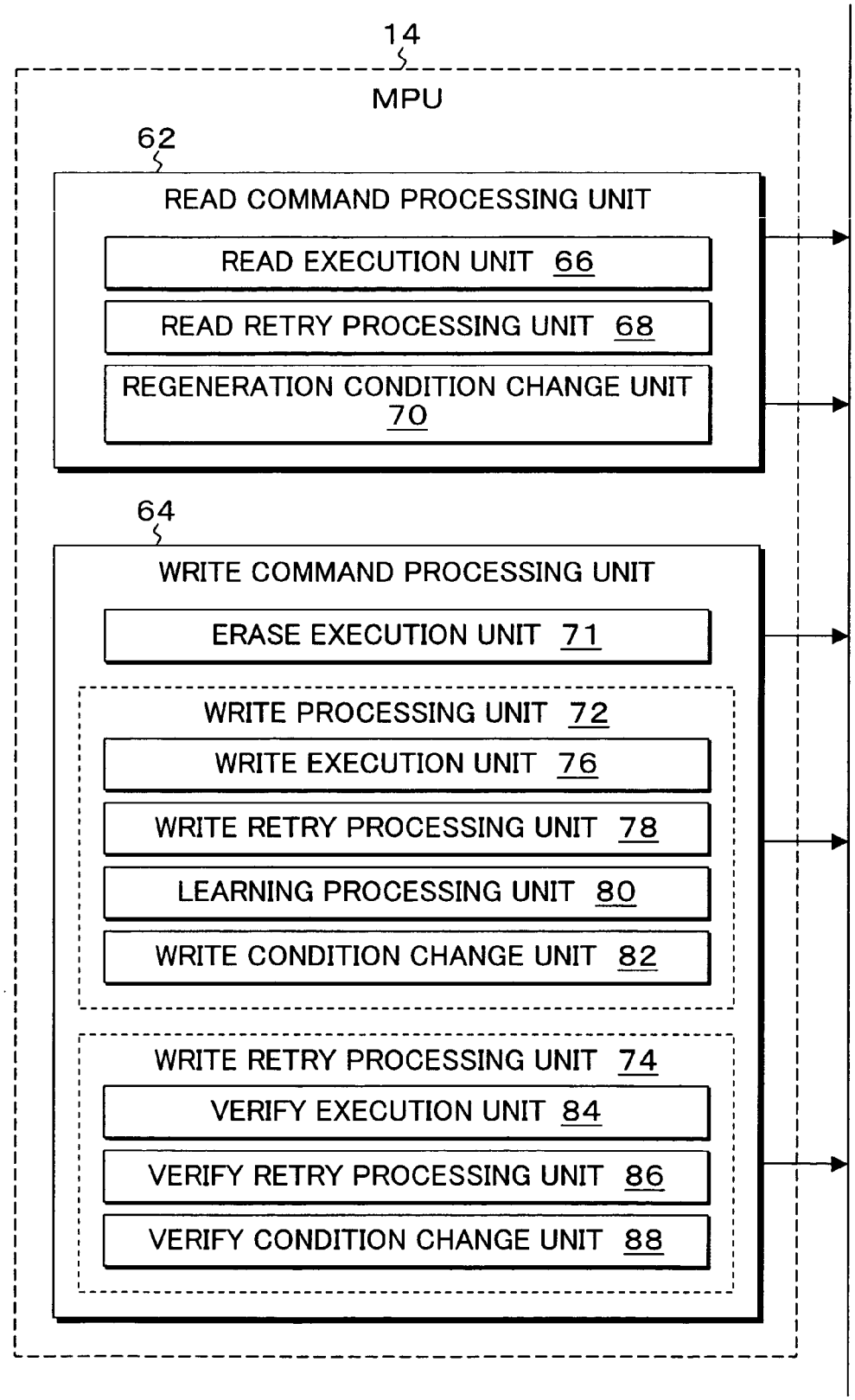
FIGS. 3A and 3B are block diagrams of a command processing function including a write retry according to the present invention.
Figure 3B:
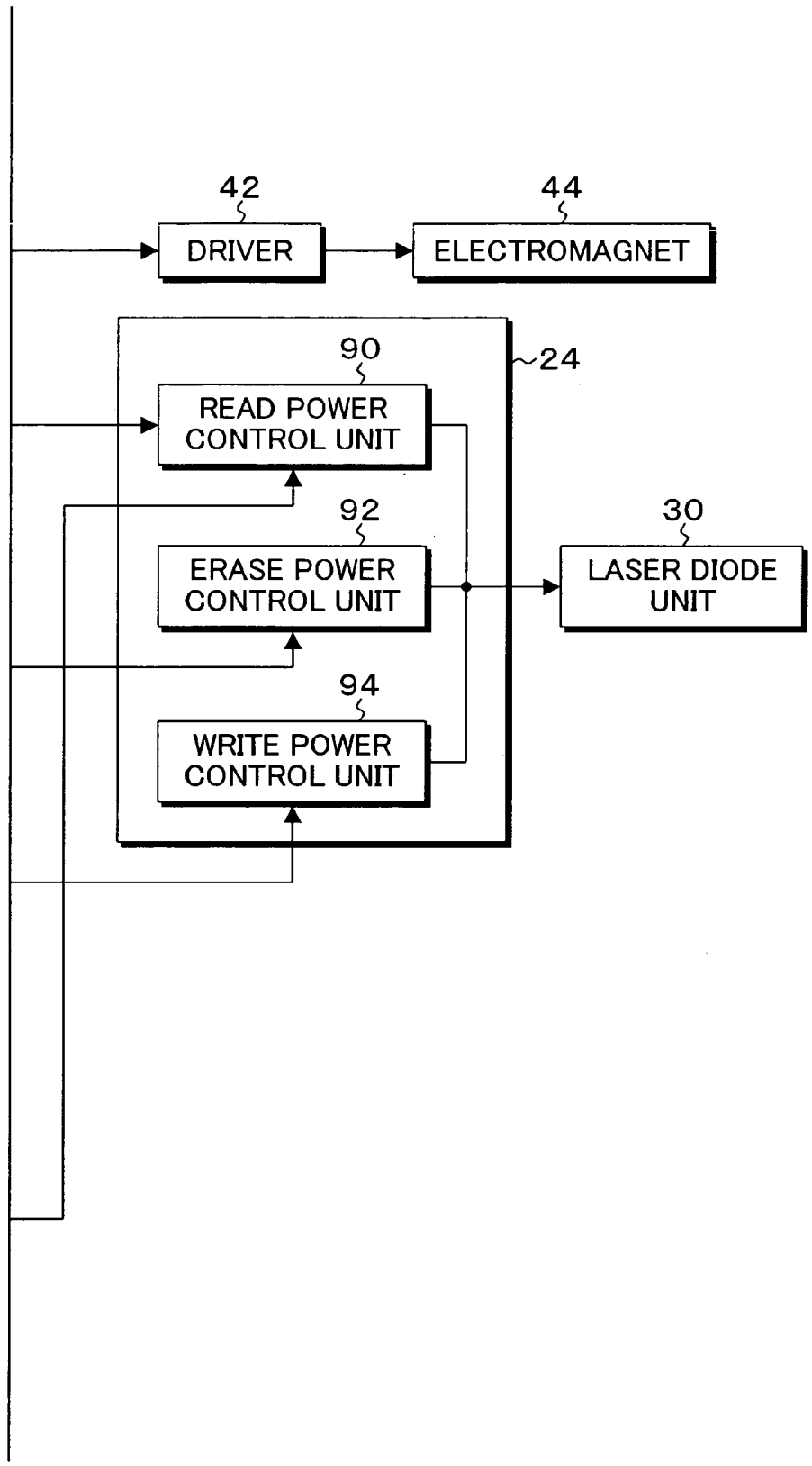

FIGS. 3A and 3B are explanatory drawings of the command processing function in the optical storage reproduction device of FIGS. 1A and 1B. In FIGS. 3A and 3B, the MPU 14 functioning as a firmware is provided with a read command processing unit 62 and a write command processing unit 64 to be executed by the program control. The read command processing unit 62 is provided with a read executing unit 66, a read retry processing unit 68 and a reproduction condition changing unit 70. The read command processing unit 62 controls the strength of the external magnetic field by the electromagnet 44 through the driver 42 at the read operation time, and at the same time, it controls the strength of the laser beam from the laser diode unit 30 through a read power control unit 90 provided in the laser diode control circuit 24. The write command processing unit 64 is provided with an erase executing unit 71, a write processing unit 72 and a verify processing unit 74. The write processing unit 72 is provided with functions of a write executing unit 76, a write retry processing unit 78 provided by the present invention, a learning processing unit 80, and a write condition changing unit 82. Further, the verify processing unit 74 is provided with functions of a verify executing unit 84, a verify rewrite processing unit 86, and a verify condition changing unit 88. The write command processing unit 64 controls the laser diode unit 30 in such a way as to become a necessary power at the erase time, the write time, and the write verify time for the read power control unit 90, an erase power control unit 92, and a write power control unit 94 provided in a laser diode control circuit 24, respectively. The read executing unit 66 provided in the read command processing unit 62 decodes a read command from a high order host, and executes a read operation for one of specific positions of the optical storage medium or a plurality of sectors. In case the data is reproduced by the read executing unit 66, when the reproduction is not normally performed, but an error occurs, the read write processing unit 68 changes the strength of the laser beam and the strength of the production magnetic field into a plurality of stages prepared in advance, respectively and performs the reproduction again. Further, the reproduction condition changing unit 70 stores, for example, the number of reproduction sectors (also referred to as [the number of blocks]) in one time read command from the host, and counts the number of reproducible sectors at each stage for individual state when the retry occurs, and provides a coefficient at each stage in advance, and changes a reproduction condition of the default from the sum total of the product of this coefficient and the number of counted reproducible sectors. The purpose of changing the strength of the laser beam in this read retry processing unit 68 and the strength of the reproduction magnetic field into plural stages and reproducing them again is to prevent a cross talk from occurring. When the write command processing unit 64 receives a write command and a data from the host, first, with a predetermined one of the optical storage media which is a write destination or a plurality of sectors taken as a target, the write command processing unit 64 performs an erase operation by operating the erase executing unit 71, and next, performs a data write operation by operating the write processing unit 72, and finally performs a verify operation by reading and comparing the written data by operating the verify processing unit 74. From among the above described units, the write retry processing unit 78 provided in the write processing unit 72, in case a verify error occurs and the verify retry fails, repeats the write retry operations of the erase, the write, and the verify, while performing a setting change of the focus offset for recoding a data on the optical storage medium, that is, adjusting the deviation of the focal point. At the time of this specific processing of the write retry processing unit 78, when the verify retry fails, that is, even when the reproduction is performed again by changing the strength of the laser beam and the strength of the reproduction magnetic field for preventing a cross talk into a plurality of stages, the verify still fails, and assuming that the write operation itself has problems, the write retry operation is repeated, while performing a setting change of the write power offset to change the write strength of the laser beam and the focus offset into the stage prepared in advance. That is, the setting change of the focus offset (second focus offset) in the write retry processing of the present invention is aimed at adjusting the deviation of the focus point, and the write retry operations of plural stages are repeated, which include the setting change of the parameter for adding the retry offset to the focus offset setting value of the default and the setting change of the parameter for subtracting the retry offset from the focus offset setting value of the default. The learning processing unit 80 learns the setting change of the focus offset in the write retry operation, and the write condition changing unit 82, based on the learning result by the learning processing unit 80, changes the focus offset of the default. As the learning processing unit 80 and the write condition changing unit 82 in the present invention, the following first and second embodiments are available. First, in the first embodiment, the learning processing unit 80, at the successful time of the write retry, retains a sum total of the successful focus offset setting value, the number of adding times of the retry offset, and the number of subtracting times of the successful retry offset as a learning result. The write condition changing unit 82, when the absolute value of the learning result retained at the learning processing unit 80 is equal to or more than a predetermined threshold value, changes the focus offset setting value of the default so as to be drawn near to the latest focus offset setting value which succeeds in the retry. In the second embodiment of the present invention, the learning processing unit 80 retains the number of recording sectors of the writ command from the host, and at the same time, every time the write retry operations of the plural stages are repeated by the write retry processing unit 78, the learning processing unit 80 retains a sum total of the product of the number of recordable sectors and the coefficient provided in advance for every stage as a learning result. In this case, the write condition changing unit 82, when the absolute value of the learning result retained in the learning processing unit 80 at the successful time of the write retry is equal to or more than a predetermined threshold value, changes the focus offset setting value of the default so as to be drawn near to the latest focus offset setting value which is successful in the retry. Further, the write retry processing unit 78 performs the setting change of the focus offset according to at least either of each zone formatted by the optical storage medium at the write retry time, each area in which the recording area of the optical storage medium is divided into a plurality of areas, and a temperature in the interior of the device. The verify retry processing unit 86 of the verify processing unit 74, in case the verify is not normally performed but ends up being in error when performing the verify reproduction after writing a data on the optical storage medium by the write processing unit 72, changes the strength of the laser beam and the strength of the reproduction magnetic field individually into the stage prepared in advance, and performs the verify again. Each function of the verify executing unit 84, the verify retry processing unit 86 and the verify condition changing unit 88 in the verify processing unit 74 has substantially the same processing function as the read executing unit 66, the read retry processing unit 68 and the reproduction condition changing unit 70 provided in the read command processing unit 62, and is different only in the type of the commands to be executed and the timing thereof. Here, the optical storage device of the present invention initially finds and sets the optimum value of the parameter for every device as a default. This optimum value of the parameter can be found by an automatic gain adjusting processing (hereinafter referred to as [GA processing]). This GA processing is performed at normal temperatures in the final assembling stage of the plant. By adjusting the optimum value of the parameter for every device in this way, the unevenness of the parameter for every device can be absorbed in the initial stage of the device. The parameter which becomes a target of the GA processing includes a servo operation and a write read operation such as a focus gain, a track gain, a focus offset, a track offset, and the like, and important parameters which affects the performance. The default value of the focus offset optimized in the present invention is found and set in the initial stage by the GA processing. However, even when the parameter is set as a default for finding the optimum value of the parameter in the initial stage of the device, the condition changes variously at the operating time of the device, and as the main condition, variation in temperature, elapse of the time, and the like can be cited. Although the optimum value of the parameter found in the GA processing can be said to be the optimum value at normal temperatures, in case the device is operated at low temperature, it cannot be necessarily said to be the optimum. That is, if there is temperature difference, electromechanical components and circuit components will be affected, and hence, in case the condition is changed due to variation in temperature, it is necessary to apply correction on the default value found by the GA processing.

Figure 4:
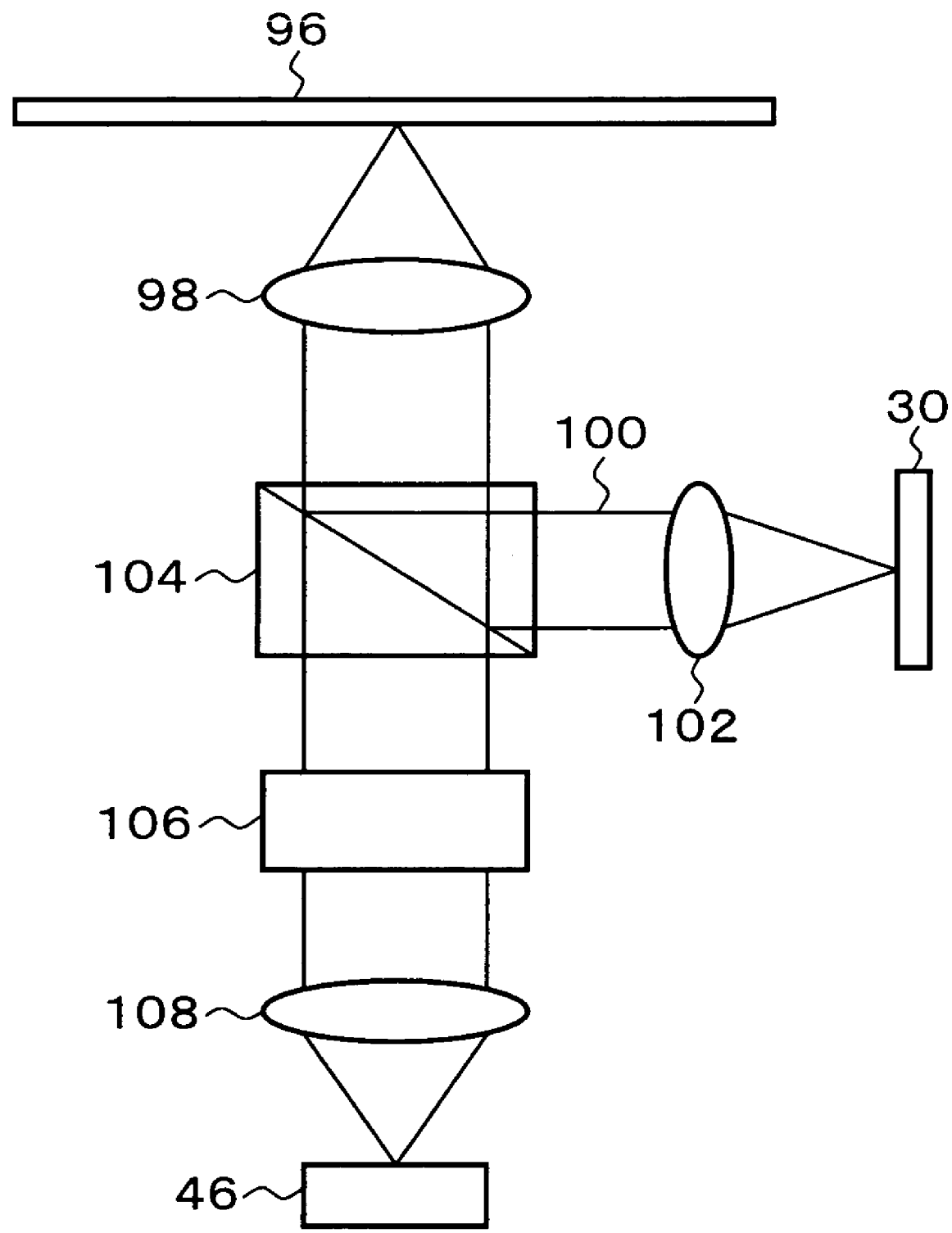
FIG. 4 is an explanatory drawing of an optical system in the optical storage device of the present invention.

Describing the correction of the optimum parameter with respect to the focus offset, the details are given as follows. FIG. 4 is an explanatory drawing of the optical system in the optical storage device of the present invention. In FIGS. 3A and 3B, the laser beam from the laser diode unit 30 is converted into a collateral beam by a collimator lens 102, and is reflected by a beam splitter 104, and passes through an object lens 98, and then, images a beam spot on a MO disc 96. The reflected light from the MO disc 96 is converged by the object lens 98, and after that, passes through the beam splitter 104, and then passes through an optical split element 106 as well as a servo lens 108, and is converged into a photodetector 46. In such an optical system, to miniaturize the entire device, it is necessary to make the optical system small, and the optical system is miniaturized by making the focal length from the servo lens 108 to the photodetector 46 short, and by that much, a light head which becomes a movable unit of the optical system can be made small. When the focal length of the lens is made small by such a miniaturization of the optical system, the optical system is prone to be affected by the defocusing, and the retry operation by the setting change of the focus offset by the present invention is required. When the focal length is made about half of the conventional type of the present applicant, the necessity of the present invention is found anew by the present applicant.

Figure 5:
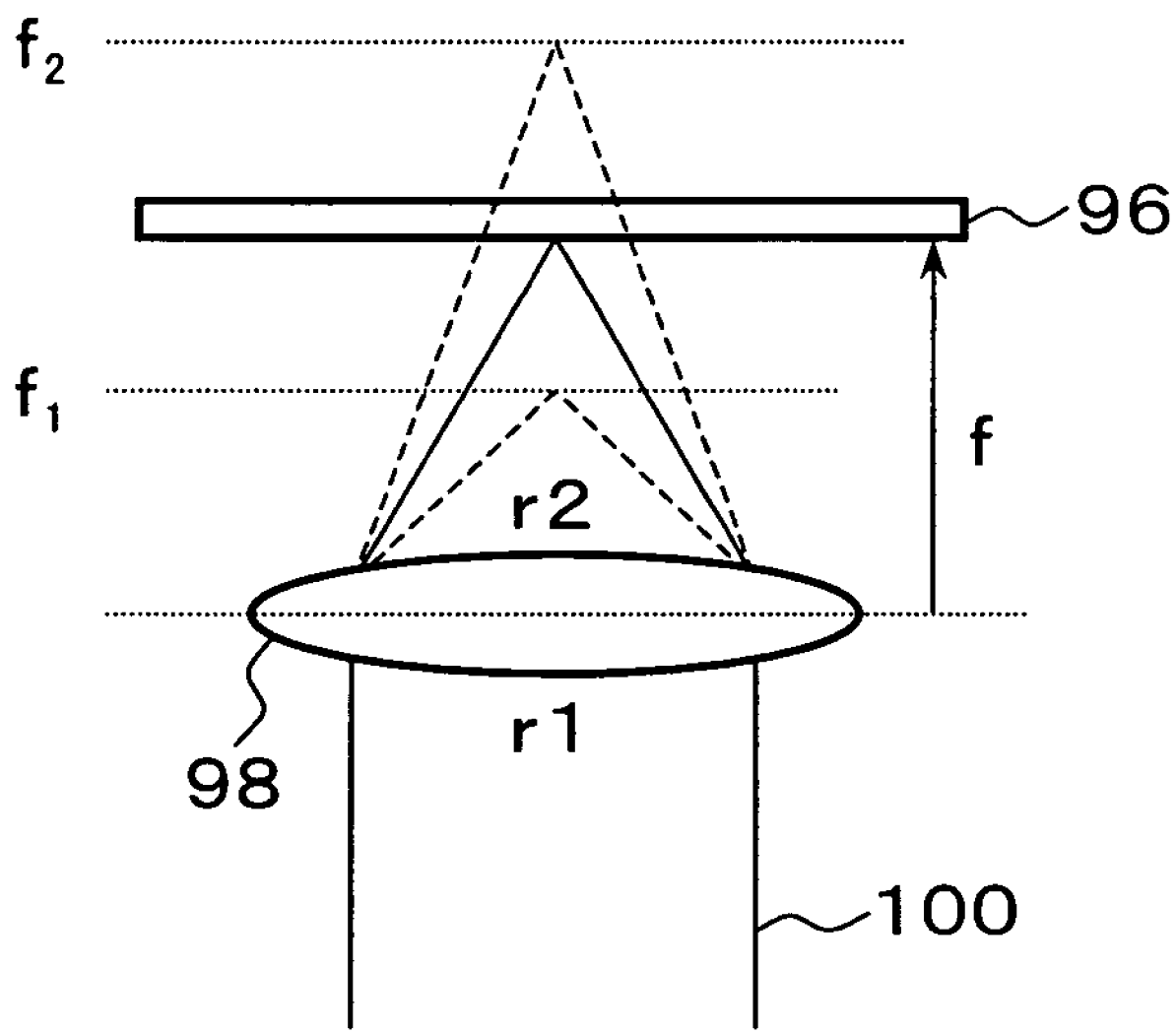
FIG. 5 is an explanatory drawing of a defocusing of an object lens for a temperature change.

FIG. 5 is an explanatory drawing of a defocusing of the object lens. In FIG. 5, the object lens 98 has a focal length f, and the curvature radii of the object lens 98 are r1 and r2, and an index of refraction is n. The wavelength of a laser beam 100 incident on the object lens 98 is $\lambda$. Here, when variation in temperature occurs, the following physical properties change.

(1) curvature radii r1 and r2 of the optical lens 98

(2) index of refraction n of the object lens 98

(3) warp, dilation, contraction of MO disc 96

(4) wave length $\lambda$ of the laser beam 100

In this case, the focal length f of the object lens 98 is given the following expression.

$$f = \frac{1}{(n-1)\{(1/r1) - (1/r2)\}}$$

Hence, when the physical properties from the above described (1) to (3) change due to temperatures, the focal length f changes. Further, since the change of the wavelength λ of the laser beam 100 of the above described (4) can be seen through the change of the index of refraction n toward the object lens 98 and the MO disc 96, even the change of this wavelength λ brings about the change of the focal length. From this, when the temperature environment changes, the focal length f of the object lens 98 changes to f1 or f2, and a focal point on the MO disc 96 is defocused, and then, the write is performed in a defocused state, and therefore, in a state in which the write power is deviated, the write is performed and the read performance is deteriorated. Hence, in the present invention, in the write retry processing, by moving the object lens 98 in a focal point direction through the setting change of the focus offset value, the write retry operation is performed while correcting the defocusing, and by the learning processing based on that result, a control target value of the focus offset of the default, that is, the focus servo is changed in case the defocusing is large.

Figure 6:
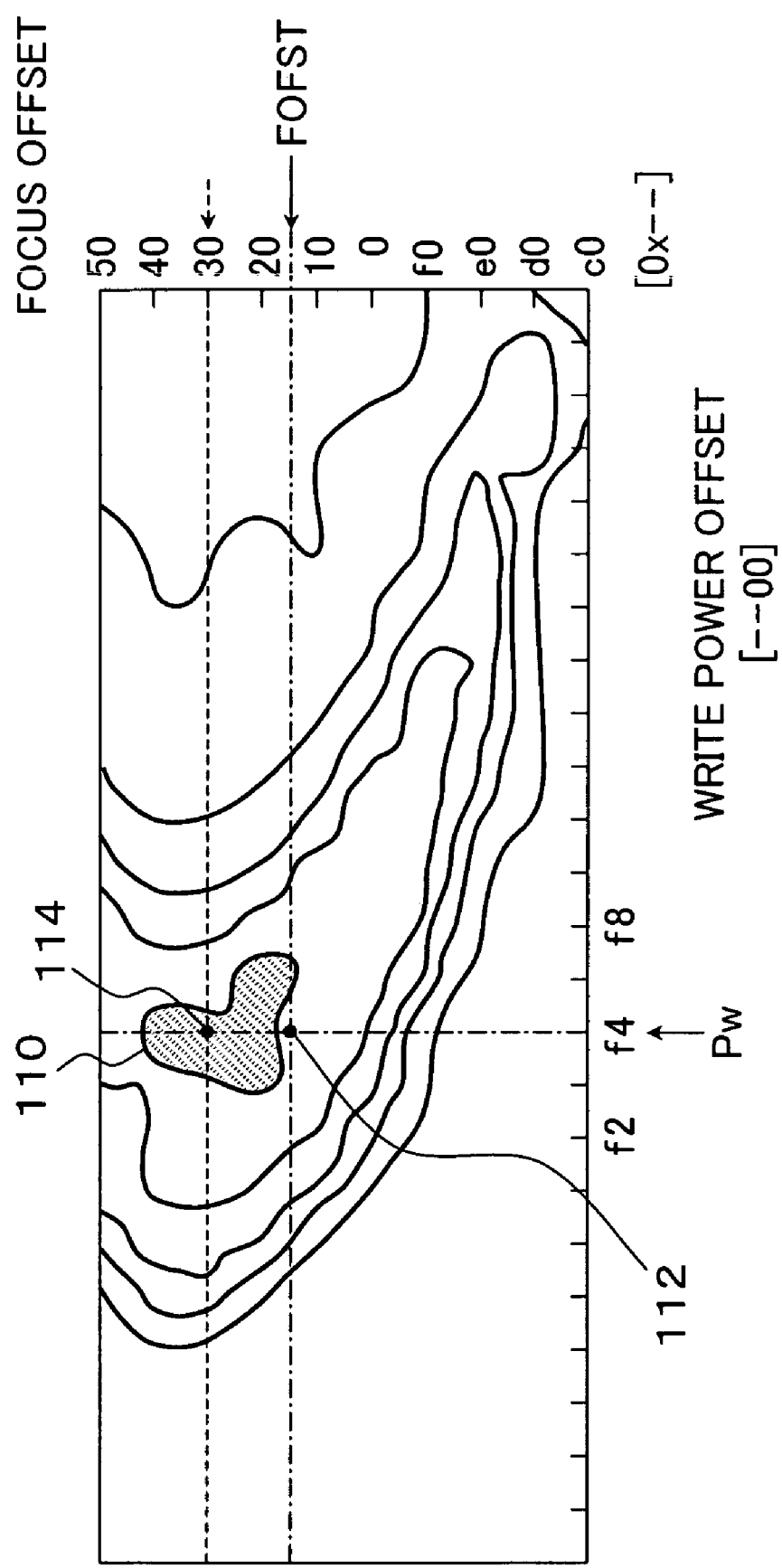
FIG. 6 is an explanatory drawing of an error rate distribution for a write power offset and a focus offset.

FIG. 6 is an explanatory drawing showing a measured error rate distribution in which the write power offset is plotted in the axis of abscissas and the focus offset in the axis of ordinates with respect to a two dimensional flat surface in the optical storage device of the present invention. In FIG. 6, a focus offset FOFST is, for example, at the control value such as [0×16] in the GA processing, and further, the write power offset Pw is at the value [f400] and has an operating point 112 on an error rate flat surface. This operating point 112 is deviated for the smallest error rate area 110 shown by an oblique line portion, and this shows a state in which the value of the focus offset of the default found by the GA processing in the measured state is deviated from the optimum value. The optimum value of the focus offset in this case is, for example, at the vicinity of [0×30], and it is allowed to have an operating point 114 in the minimum error area 110. In the present invention, in a state of the operating point 112 wherein the focus offset of FIG. 6 is deviated, when the write processing fails and becomes the write retry processing, the write retry operation is performed, while changing the default value of the focus offset having the operating point 112 by adding and subtracting the offset in plus and minus sides, and in this case, the retry offset is added to the focus offset so as to be changed to a plus side, and then, the operating point is entered in the minimum error rate area 110, so that the write retry processing is allowed to be successful. At the time of such a write retry operation, even when the setting value of the focus offset is changed so that the write processing is allowed to be successful, unless the default value of the focus offset changes, the similar write retry occurs later on. Hence, in the present invention, the write retry is made successful not only by the setting change of the write power and the focus offset in the write retry processing, but the state at the time of the write retry at the time of the successful write is also stored and learned with the setting value and the relation between the setting value at the successful time and the successful sector learned as well, thereby changing the default value of the focus offset.

FIG. 7 is an explanatory drawing of the write retry control table used in the first embodiment of the write retry processing of the present invention. In the first embodiment of the write retry processing according to a write retry control table 116 of FIG. 7, when a verify retry commits a retry out, the write retry processing of six stages shown in the number of write processing from 1 to 6 are performed, while changing the write condition. That is, in the first time write retry, though both the write power and the focus offset are default, in the second time, the write power is added with a retry offset ΔPw, and in the third time, the retry offset ΔPw is subtracted, thereby changing the write power. In the fourth and fifth times, the setting value of the focus offset is changed. That is, in the fourth time, a retry offset ΔFOFST is added, thereby increasing the focus offset, and in the fifth times, a retry offset ΔFOFST is subtracted, thereby decreasing the focus offset. In the final sixth time, the write retry taking both the write power and the focus offset as the default is performed.

Figure 8A:
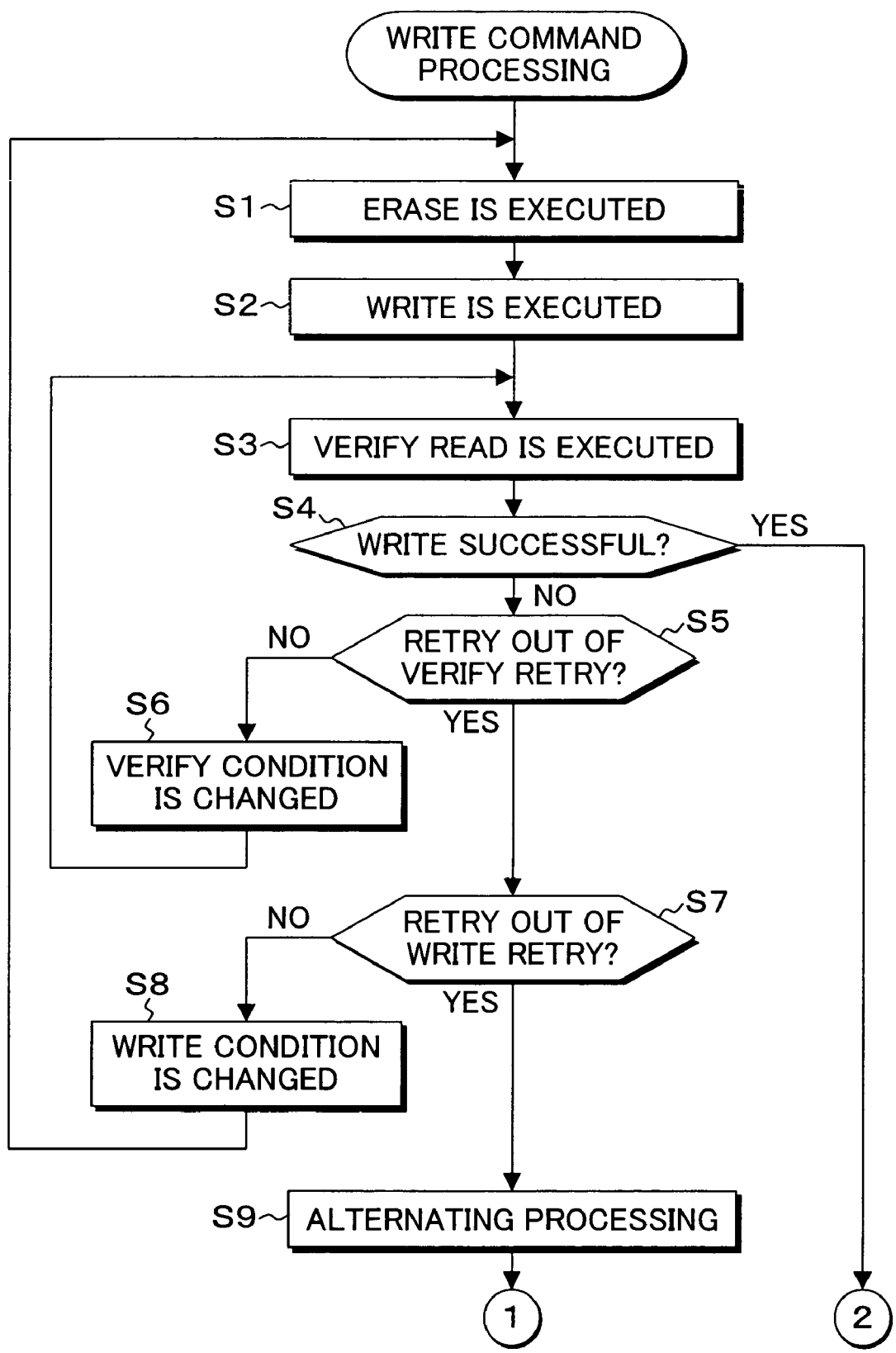
FIGS. 8A and 8B are flowcharts of a write command processing of the present invention including the first embodiment of the write retry processing.
Figure 8B:
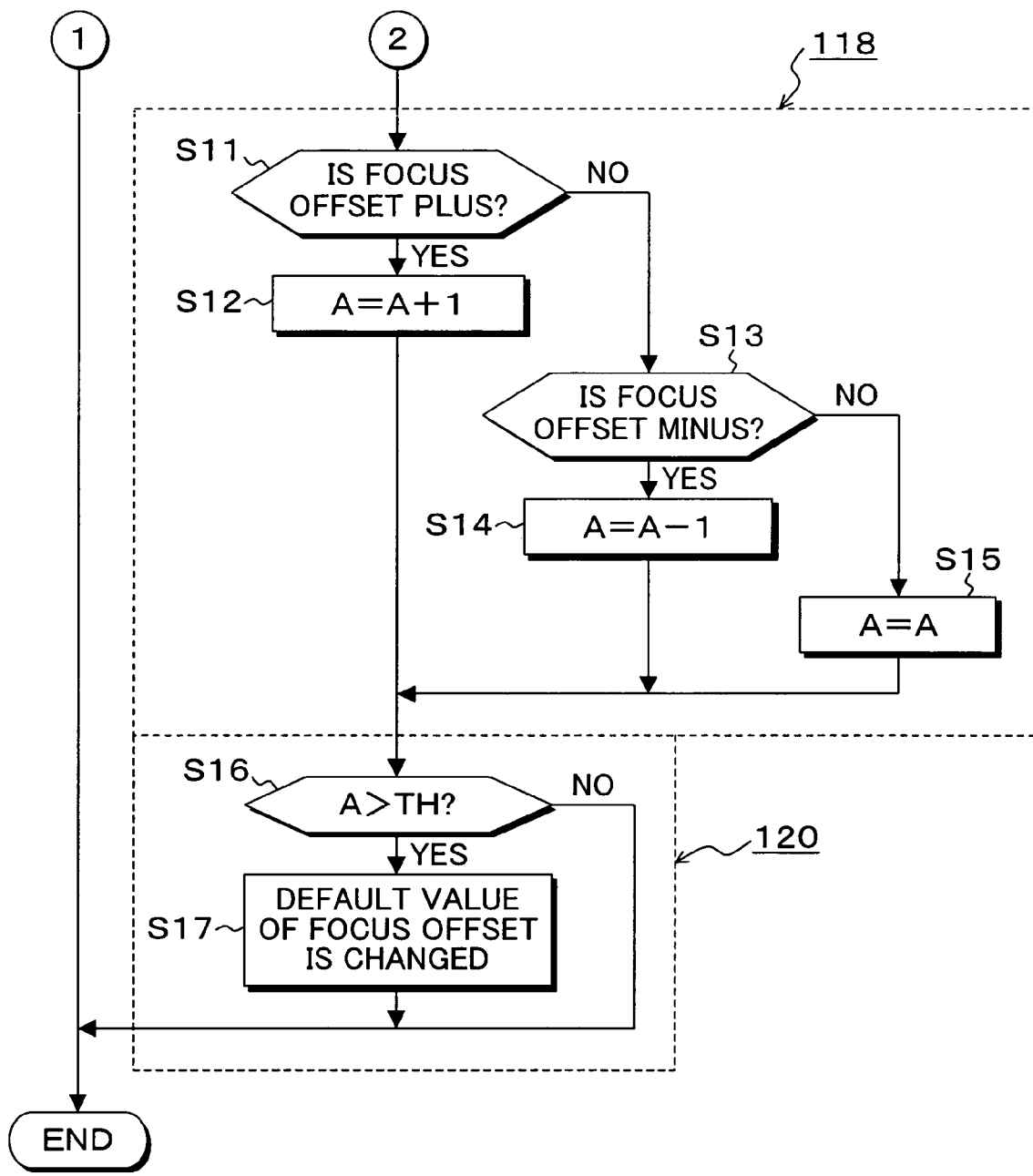

FIGS. 8A and 8B are flowcharts of the write command processing of the present invention including the first embodiment of the write retry processing using the write retry control table 116 of FIG. 7. In FIGS. 8A and 8B, the write command processing executes the erase operation of the write target sector of the optical storage medium with respect to the write command received from the host at step S1. Subsequently, at step S2, the write operation is executed on the target sector, on which the erasing has finished. Next, at step S3, a verify operation is executed, which reproduces and verifies a data reproduced from the target sector, on which the write operation has finished. At step S4, when a successful write is determined, the processing is completed through a learning processing 118 of steps S11 to S15 and a write condition changing processing 120 of steps S16 to S18. At step S4, when the write processing fails, the processing advances to step S5, and the retry out of the write verify, that is, the write verify is repeated for a predetermined number of times, and until it becomes an error, the verify retry is repeated, while changing the verify condition at step S6. At step S5, when the verify retry fails and becomes a retry out, at step S7, the retry out of the write retry is checked, and by performing the write retry of the predetermined number of times, until it becomes the retry out, the erase execution, the write execution and the write verify execution from step S1 are repeated, while changing the write condition at step S8. At step S7, when the write retry fails and becomes the retry out, the processing advances to step S9, and it is determined to be a medium defect, and a replacement processing is executed. The write retry processing accompanied with the change of the write condition by this step S8, as shown in the write retry control table 116 of FIG. 7, performs the write retry processing by changing the write power and the focus offset (including the default) in each stage as shown in the first to the six times of the number of write retry times at each stage. When the successful write is determined at step S4 in the midst of the write retry processing, the learning processing 118 of step S11 to S15 is executed. The learning processing 118 checks whether or not the focus offset is plus by arithmetic addition of a retry offset ΔFOFST when the write is successful at step S11, and if it is plus, a learning counter A is counted up by 1 at step S12. If it is not plus, the process advances to step S13, and it is determined whether or not the focus offset is minus by subtraction of the retry offset ΔFOFST, and when it is minus, the process advances to step S14, and the learning counter A is counted down by 1. In the meantime, when there is no change in the focus offset, the value of the learning counter A at that time is maintained at step S15. Subsequently, the write condition change processing 120 is executed. In the write condition change processing 120, at step S16, the absolute value of the learning counter A obtained by the learning processing 118 is compared to the predetermined threshold value TH, and if it is equal to or more than the threshold value TH, the process advances to step S18, and the default value of the focus offset is changed. The change of the default value of the focus offset is effected such that it is drawn near to the latest focus offset setting value which is successful in the write retry. For example, in a state of the operating point 112 of FIG. 6, in case the operating point is changed to the operating point 114 by increasing the focus offset so that the retry processing becomes successful, a change is made such that the operating point 112 of the default is increased to the predetermined value so that the operating point 112 of the default is drawn near to the operating point 114.

FIG. 9 is an explanatory drawing of a write retry control table used in the second embodiment of the write retry processing of the present invention. In this write retry control table 122 used in the second embodiment, similarly to the write retry control table 116 used in the first embodiment of FIG. 7, the write retry processing of six stages from the first to the sixth times as the number of write retry times is set, and though the same holds true with the change of the write power and the focus offset in each stage, a coefficient used for the learning processing for every stage is set. This coefficient takes the case of the focus offset being set as an example, and sets a coefficient [−1] for the default of the first to the six time focus offset, and sets a coefficient [+1000] for the fourth time focus offset ΔFOFST arithmetic addition, and sets a coefficient [−1000] for the fifth time focus offset ΔFOFST subtraction. As for the second and third times in which the write power is changed, though the coefficient similarly to the case of the focus offset according to the addition and subtraction of the write power is set, since it is not used for the learning of the focus offset, it is omitted.

Figure 10:
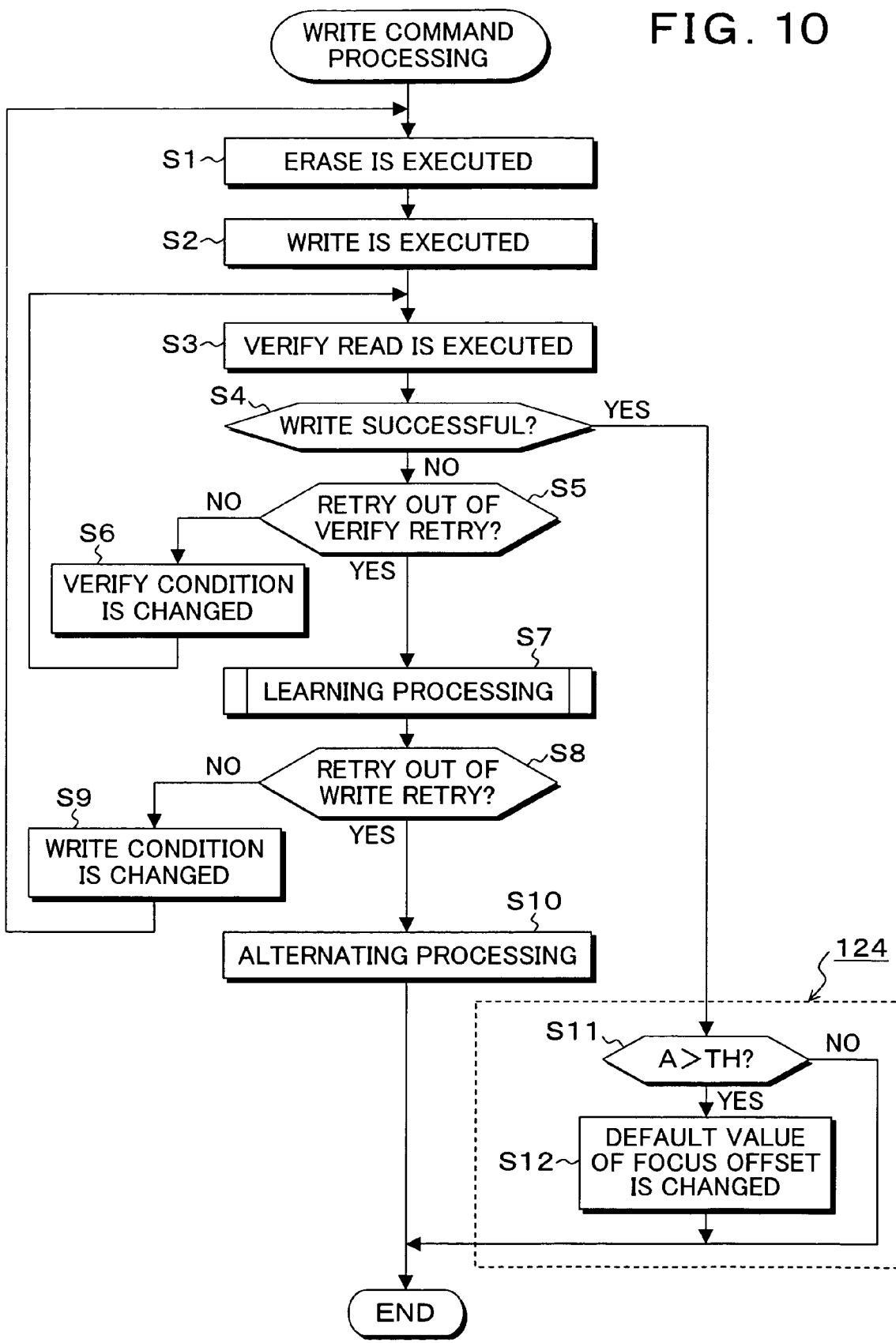
FIG. 10 is a flowchart of a write command processing of the present invention including the second embodiment of the write retry processing.

FIG. 10 is a flowchart of a write command processing of the present invention including the second embodiment of the write retry processing. In FIG. 10, at step S1, based on the write command received from the host, the erase operation of the write object sector of the optical storage medium is executed. Next, at step S2, the write operation is executed for the object sector having finished the erase. Further, at step S3, the write verify for reproducing and detecting the date from the object sector having finished the write operation is executed. Here, at the executing time of the write command processing, the number of processing sectors is retained in advance for the write command received from the host. At step S4, in case the write fails, the verify retry is repeated until it becomes the retry out of the write verify at step S5, while changing the verify condition at step S6. In case the write verify becomes the retry out at step S5, the learning processing of the second embodiment is executed at step S7. The learning processing of Step 7 is executed for every number of times from the first to the sixth of the write retry control table 116 of FIG. 7 in which the write retry becomes the retry out at step S8. Further, the change of the write condition of step S9 is performed according to the change of the write power focus offset (including the default) according to the content of the first to the six times of the write retry control table 122 of FIG. 9. In case the write retry fails at step S8 and becomes the retry out, the process advances to step S10, and it is determined to be a medium defect, and an alternative processing is executed.

Figure 11:
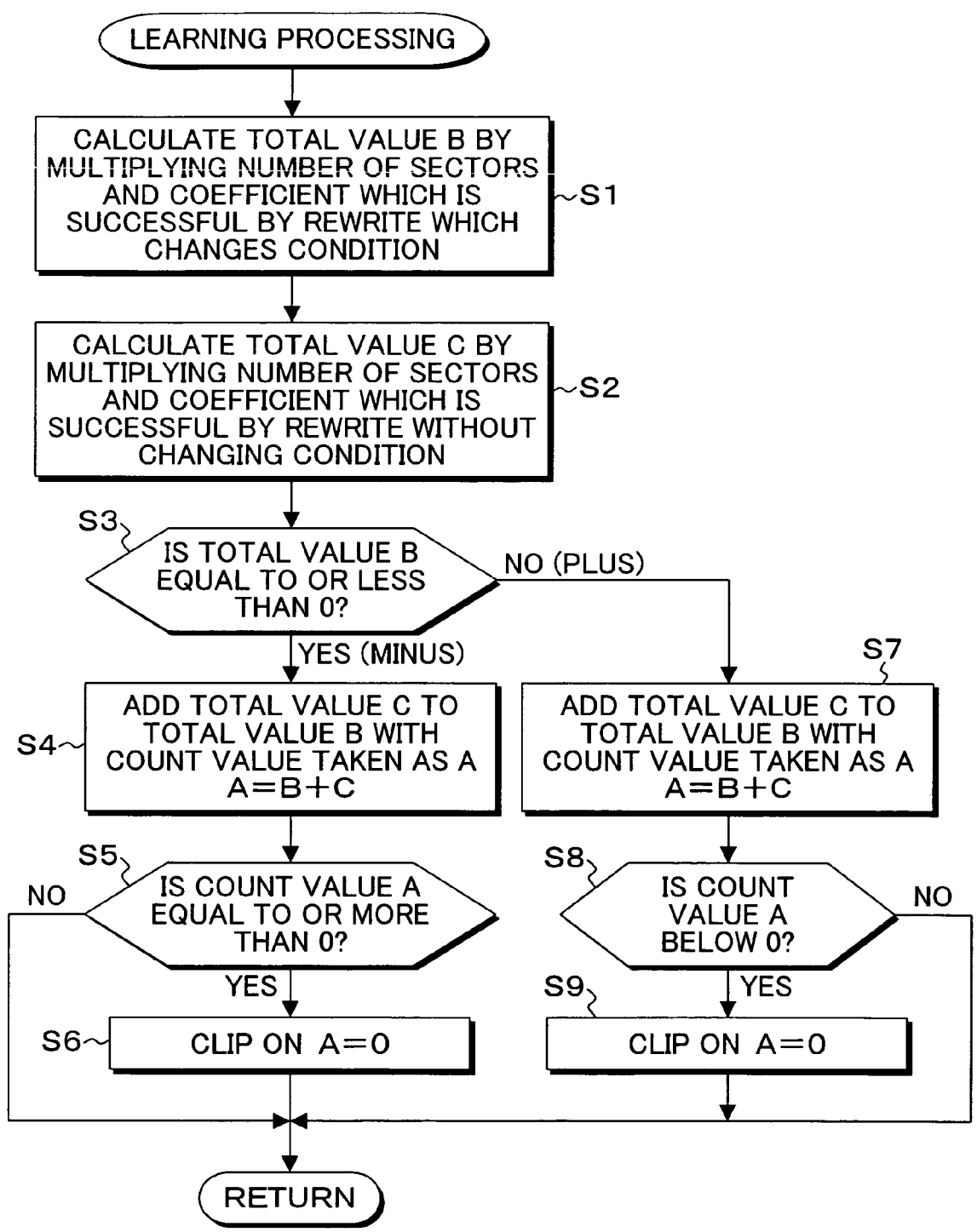
FIG. 11 is a flowchart of a learning processing of FIG. 10.

FIG. 11 is a flowchart of the learning processing in step S7 of FIG. 10. In this learning processing, the number of sectors succeeding in the retry to change the recording condition at step S1 is multiplied by the coefficient to calculate a total value B. Next, at step S2, the number of sectors succeeding in the retry not to change the recording condition, that is, the retry of the default is multiplied by the coefficient to calculate a total value C. Next, at step S3, it is checked whether or not a sum total value of the total value B found at step S1 and the learning count value at the previous learning completion time is below 0, that is, minus or plus. If it is minus, the process advances to step S4, and a sum total value of the total value B and the learning count value at the previous learning completion time taken as a learning count value A is added with a total value C, thereby finding A=(the count value at the previous learning completion time)+B+C. Next, at step S5, it is checked whether or not the learning count value A is equal to or more than 0, and since, in this case, the calculation of the count value A having the minus value is performed, in case it is equal to or more than 0, the count value A is clipped to 0 at step S6. In the meantime, at step S3, in case the sum total value of the total value B and the learning count value at the previous learning completion time is plus which is equal to or more than 0, the process advances to step S7, and with the learning count value taken as A, a total value C is subtracted from a sum total value of the total value B and the learning count value at the previous learning completion time, thereby obtaining A=(the count value of the previous learning completion time)+B−C. At step S8, since the learning count value A of this case finds a plus value, in case it is below 0, that is, it is minus, the count value A is clipped at 0 at step S9.

FIG. 12 is an explanatory view of a specific example of the learning count value A generated in the learning processing of FIG. 11. This processing relates to the case where the number of processing sectors received by the write command from the host is taken as 10. In the first time of the number of write retry times, the number of successful sectors is zero, and also in the second and third times where the write power is changed, the number of successful sectors is zero, and in the fourth time where the focus offset is increased, the number of processing sectors is 10, while the number of successful sectors is three. Further, in the fifth time wherein the focus offset is subtracted, the number of remaining processing sectors is seven, while the number of successful sectors is also seven so that the write processing becomes successful. In such a write retry processing of FIG. 12, the coefficient of the number of sectors successful in the retries of the fourth and fifth times which change the recording condition of step S1 of FIG. 11 is multiplied so as to find the total value B by the following expression. Further, the learning count value at the previous learning completion time is considered as 0.

$$B=3\times(+1000)+7\times(-1000)=+3000-7000=-4000$$

Next, at step S2, when the number of sectors successful in the first retry which does not change the recording condition is multiplied by the coefficient so as to calculate the total value C, the following expression is established.

$$C=0\times(-1)=0$$

Subsequently, at step S3, since the total value B is B=−4000, and the sum total value of the learning count value at the previous learning completion time and the total value B is −4000, the process advances to step S4, and the following expression is established.

$$A=\text{(learning count value at the previous learning completion time)}+B+C=0+(-4000)+0=-4000$$

At step S5, since A is not equal to or more than 0, step S6 is skipped and the processing is completed.

When the learning processing of FIG. 11 is completed, the process returns to the main routine of FIG. 10, and the write retry proves successful, and the process advances from step S4 to step S11 of the write condition change processing 124, and the absolute value of the learning count value A is compared to the predetermined threshold value TH previously decided, for example, TH=5000, and if it is equal to or more than the threshold value TH, at step S12, a change processing is performed such that the default value of the focus offset is changed and drawn near to the setting value of the initial focus offset which succeeds in the write retry. The present invention provides a program to be executed by a computer such as a MPU provided in the optical storage device, and this program has a processing procedure according to the flowchart of FIGS. 8A and 8B for the first embodiment and according to flowchart of FIGS. 10 and 11 for the second embodiment.

The present invention includes adequate modifications not damaging its purpose and advantage, and moreover, it is not intended to be limited by the numerical values shown in the above described embodiments. Further, though the above described embodiments have been described by the MO drive requiring the erase in the write operation, the embodiments are also adaptable to a drive such as CD-R not requiring the erase in the write operation, CD-R/W, DVD-R, DVD-RAM, DVD-R/W and the like, and a drive such as MD.

What is claimed is:

1. An optical storage device comprising:
    a recording unit for recording a data on an optical storage medium by a laser beam;
    a reproduction unit for reproducing the data recorded in the optical storage medium by setting a parameter necessary for reproduction to an optimum value;
    a write retry processing unit for repeating a write retry operation of a write and a verify, while performing a setting change of a focus offset for recording the data on the optical storage medium in case a verify error occurs in the recording unit and a verify retry fails; and
    a learning processing unit in which the number of recording sectors of a write command from a high order device is retained, and at the same time, every time the write retry operation of a plurality of stages is repeated by the write retry processing unit, a sum total of the product of the number of recordable sectors and a coefficient provided in advance for each stage is retained as a learning result; and
    a write condition change unit in which, at the write retry successful time, when the absolute value of the learning result is equal to or more than a predetermined threshold value, the focus offset setting value of the default is changed so as to be drawn near the latest focus offset selling value which is successful in the retry;
    wherein the write retry processing unit repeats a plurality of stages of write retry operations including a setting change of the parameter for adding a retry offset to a focus offset setting value of a default at the write retry time and the setting change of the parameter for subtracting a retry offset from the focus offset setting value; and
    wherein the write condition change unit calculates a first total value totaling the value multiplying the number of sectors successful for every write retry to change the recording condition by a predetermined coefficient;
    calculates a second total value totaling the value multiplying the number of sectors successful for every write retry not to change the recording condition by a predetermined coefficient;
    finds the learning count value by adding the second total value to a sum total value of the value of the learning count value at the previous learning completion time and the first total value in case the total value of the learning count value at the previous learning completion time and the first total value is below 0, and in case the learning count value is equal to or more than 0, it is clipped to 0, and in case the learning count value is below 0, it is retained as it is, and
    finds the learning count value by subtracting the second total value from a sum total value of the learning count value at the previous learning completion time and the first total value in case the total value of the learning count value at the previous learning completion time and the first total value is equal to or more than 0, and in case the learning count value is below 0, it is clipped to 0, and in case the learning count value is equal to or more than 0, it is retained as it is.

2. The device according to claim 1, wherein:
    the learning processing unit retains a sum total of the number of addition times of a successful focus offset setting value and the retry offset and the number of subtractions of a successful retry offset as the learning result at the retry successful time; and
    the write condition change unit retains the focus offset setting value of the default so as to be drawn near to the latest focus offset setting value which succeeds in a retry when the absolute value of the learning result retained in the learning processing unit is equal to or more than the predetermined threshold value.

3. The device according to claim 1, wherein, at the write retry time, the write retry processing unit performs the setting change of the focus offset according to at least any one of each zone formatted by the optical storage medium at the write retry time, each area dividing a recording area of the optical storage medium into a plurality of areas, and the temperature inside the device.

4. A recording method of an optical storage device, comprising:
    a recording step of recording a data on an optical storage medium by a laser beam :
    a write retry processing step of repeating a write retry operation of a write and a verify, while performing a setting change of a focus offset for recording the data on the optical storage medium in case a verify error occurs in the recording unit and a verify retry fails;
    a learning processing step in which the number of recording sectors of the write command from the high order device is retained, and at the same time, every time the write retry operation of a plurality of stages is repeated by the write retry processing unit, a sum total of the product of the number of recordable sectors and the coefficient provided in advance for each stage is retained as a learning result; and
    a write condition change step in which, at the write retry successful time, when the absolute value of the learning result is equal to or more than the predetermined threshold value, the focus offset setting value of the default is changed so as to be drawn near the latest focus offset setting value which is successful in the retry;
    wherein the write retry processing step, at the write retry time, repeats the write retry operation of a plurality of stages including the setting change of the parameter for adding the retry offset to the focus offset setting value of the default at the setting change of the parameter for subtracting the retry offset from the focus offset setting value; and
    wherein the learning process step comprises the steps of:
    calculating a first total value totaling the value multiplying the number of successful sectors for every write retry to change the condition by a predetermined coefficient;

calculating a second total value totaling the value multiplying the number of successful sectors for every write retry not to change the condition by a predetermined coefficient;

finding the learning count value by adding the second total value to a sum total value of the learning count value at the previous learning completion time and the first total value in case the total value of the learning count value at the previous learning completion time, and in case the learning count value is equal to or more than 0, it is clipped to 0, and in case the learning count value is below 0, it is retained as it is, and finding the learning count value by subtracting the second total value from a sum total value of the learning count value at the previous learning completion time and the first total value in case the total value of the learning count value at the previous learning completion time and the first total value is equal to or more than 0, and in case the learning count value is below 0, it is clipped to 0, and in case the learning count value is equal to or more than 0, it is retained as it is.

5. The method according to claim 4, wherein:

the learning processing step retains a sum total of the successful focus offset setting value, the number of addition times of the retry offset, and the number of subtraction times of the successful retry offset as the learning result at the write retry successful time; and the write condition change step changes the focus offset setting value of the default so as to be drawn near to the latest focus offset setting value which succeeds in the retry when the absolute value of the learning result retained in the learning processing unit is equal to or more than the threshold value.

6. The method according to claim 4, wherein the write retry processing step performs the setting change of the focus offset according to at least any one of each zone formatted by the optical storage medium at the write retry time, each area dividing a recoding area of the optical storage medium into a plurality of areas, and the temperature inside the device.

7. A computer-readable storage medium which stores a program for allowing a computer to execute:

a recording step of recording a data on an optical storage medium by a laser beam;

a write retry processing step of repeating a write retry operation of a write and a verify, while performing a setting change of a focus offset for recording the data on the optical storage medium in case a verify error occurs at the recording step and a verify retry fails;

a learning processing step in which the number of recording sectors of the write command from the high order device is retained, and at the same time, every time the write retry operation of a plurality of stages is repeated by the write retry processing step, a sum total of the product of the number of recordable sectors and the coefficient provided in advance for each stage is retained as a learning result; and a recording condition renewing step of renewing the focus offset setting value of the default is renewed so as to be drawn near the latest focus offset selling value which succeeds in the retry when the absolute value of the learning result is equal to or more than the predetermined threshold value at the write retry successful time, wherein the write retry processing step, at the write retry time, repeats the write retry operations of plural stages which include the setting change of the parameter for adding the retry offset to the focus offset of the default and the setting change of the parameter for subtracting the retry offset from the focus offset setting value; and wherein the learning process step further comprises the steps of:

calculating a first total value totaling the value multiplying the number of successful sectors for every write retry to change the condition by a predetermined coefficient;

calculating a second total value totaling the value multiplying the number of successful sectors for every write retry not to change the condition by a predetermined coefficient;

finding the learning count value by adding the second total value to a sum total value of the learning count value at the previous learning completion time and the first total value in case the total value of the learning count value at the previous learning completion time, and the first total value is below 0, and in case the learning count value is equal to or more than 0, it is clipped to 0, and in case the learning count value is below 0, it is retained as it is, and finding the learning count value by subtracting the second total value from a sum total value of the learning count value at the previous learning completion time and the first total value in case the total value of the learning count value at the previous learning completion time and the first total value is equal to or more than 0, and in case the learning count value is below 0, it is clipped to 0, and in case the learning count value is equal to or more than 0, it is retained as it is.

8. The storage medium according to claim 7, wherein:

the learning processing step retains a sum total of the successful focus offset setting value, the number of addition times of the retry offset, and the number of subtraction times of the successful retry offset as the learning result at the write retry successful time; and the write condition change step changes the focus offset setting value of the default so as to be drawn near to the latest focus offset setting value which succeeds in the retry when the absolute value of the learning result retained in the learning processing unit is equal to or more than the threshold value.

9. The storage medium according to claim 7, wherein the write retry processing step performs the setting change of the focus offset according to at least any one of each zone formatted by the optical storage medium at the write retry time, each area dividing a recoding area of the optical storage medium into a plurality of areas, and the temperature inside the device.

* * * * *